United States Patent
Bailey Noval et al.

(10) Patent No.: US 10,006,361 B2
(45) Date of Patent: Jun. 26, 2018

(54) MULTI-FAN ENGINE WITH AN ENHANCED POWER TRANSMISSION

(71) Applicant: Airbus Operations S.L., Madrid (ES)

(72) Inventors: Nicolas Bailey Noval, Madrid (ES); Raul Llamas Sandin, Madrid (ES)

(73) Assignee: Airbus Operations S.L., Madrid (ES)

(*) Notice: Subject to any disclaimer, the term of this patent is extended or adjusted under 35 U.S.C. 154(b) by 302 days.

(21) Appl. No.: 14/857,103

(22) Filed: Sep. 17, 2015

(65) Prior Publication Data
US 2016/0076444 A1 Mar. 17, 2016

(30) Foreign Application Priority Data
Sep. 17, 2014 (EP) .................. 14382350

(51) Int. Cl.
F02C 3/107 (2006.01)
F16H 1/20 (2006.01)
F02K 3/06 (2006.01)
F02K 3/077 (2006.01)
F02C 7/36 (2006.01)

(52) U.S. Cl.
CPC ............ F02C 3/107 (2013.01); F02C 7/36 (2013.01); F02K 3/06 (2013.01); F02K 3/077 (2013.01); F16H 1/20 (2013.01); F05D 2220/32 (2013.01); F05D 2260/4031 (2013.01)

(58) Field of Classification Search
CPC .... F02C 3/107; F02C 7/36; F02K 3/06; F02K 3/077; F16H 1/20; F05D 2220/32; F05D 2260/4031
See application file for complete search history.

(56) References Cited

U.S. PATENT DOCUMENTS

| 2,512,794 A | * | 6/1950 | Goddard, Jr. | .......... B64D 27/18 244/15 |
| 3,054,577 A | | 9/1962 | Wolf et al. | |
| 3,229,933 A | | 1/1966 | Kutney | |
| 4,149,374 A | * | 4/1979 | Barchenko | ............... F02C 7/36 60/225 |
| 6,792,745 B2 | | 9/2004 | Wojciechowski | |

(Continued)

FOREIGN PATENT DOCUMENTS

| CN | 102001440 | 4/2011 |
| EP | 1 637 725 | 3/2006 |

(Continued)

OTHER PUBLICATIONS

European Search Report cited in EP 14 38 2350 completed Apr. 13, 2015, 4 pages.

Primary Examiner — Igor Kershteyn
(74) Attorney, Agent, or Firm — Nixon & Vanderhye P.C.

(57) ABSTRACT

A multi-fan engine including a gas turbine engine, a casing and fans encased by geared rings, which connect with the geared rings of an adjacent fan(s) such that the rotation of one fan rotates the other fans. Intermediate gears may prove the connection between adjacent geared rings, wherein the intermediate gears are retracted by linear actuators to disengage the intermediate gears from the geared rings and thereby disengage the fans from each other. The multi-fan engine may be mounted flush to the fuselage of an aircraft invention to capture into the fans boundary layer airflow moving over the skin of the fuselage.

17 Claims, 4 Drawing Sheets

(56) References Cited

U.S. PATENT DOCUMENTS

| | | | |
|---|---|---|---|
| 7,752,834 B2* | 7/2010 | Addis | B64D 27/10 244/60 |
| 8,015,796 B2 | 9/2011 | Babu et al. | |
| 8,402,740 B2 | 3/2013 | Guemmer | |
| 9,346,551 B2* | 5/2016 | Stretton | B64D 27/14 |
| 2009/0229243 A1 | 9/2009 | Guemmer | |
| 2013/0223991 A1 | 8/2013 | Suciu et al. | |
| 2014/0117152 A1 | 5/2014 | Suciu et al. | |

FOREIGN PATENT DOCUMENTS

| | | |
|---|---|---|
| EP | 1 916 406 | 4/2008 |
| FR | 3 009 028 | 1/2015 |

\* cited by examiner

MULTI-FAN ENGINE WITH AN ENHANCED POWER TRANSMISSION

RELATED APPLICATION

This application claims priority to European Patent Application No. 14382350.8 filed Sep. 17, 2014, which is hereby incorporated by reference in its entirety.

FIELD OF THE INVENTION

This invention relates to propulsion engines and more particularly to multi-fan engines for aircraft and other vehicles.

BACKGROUND OF THE INVENTION

In the aeronautical industry, the current trend in turbofan design is to increase the bypass ratio in order to improve fuel consumption through increased propulsive efficiency and to reduce perceived noise on ground. In conventional turbofan engines, the pursuit of higher propulsive efficiency requires increasing the fan diameter in order to produce a higher by-pass mass flow at lower slipstream velocities. The incremental evolution of the current state of the art envisages Very High Bypass Ratio (VHBPR) turbofans (BPR greater than 15) having fan diameters of up to 174".

As the continuous increase of the fan diameter generates problems of ground clearance and engine integration and installation in the wing or fuselage, an innovative turbofan engine concept has been proposed consisting in splitting the secondary by-pass flow into a plurality of fans of smaller diameter, all connected to the power generation unit (known as multi-fan engines).

For example U.S. Pat. No. 6,792,745 B2 discloses a turbofan jet engine having a housing and an engine core disposed in the housing. The engine core includes at least a compressor, turbine, and a drive shaft. The drive shaft defines a drive shaft axis. A plurality of fans is disposed in the housing and each fan rotates about a separate fan axis. Each of the fan axes is axially offset from the drive shaft axis. The turbofan jet engine further includes a drive system operably interconnecting the engine core and fans so as to drive the rotation of the fans and selectively disengage selected fans from the engine core.

EP 1,916,406 A2, U.S. Pat. No. 8,015,796 B2, U.S. Pat. No. 8,402,740 B2 and US 2013/0223991 A1 also disclose multi-fan engines.

In the above-mentioned prior art, each fan is driven by a shaft connected by a particular mechanical arrangement to the shaft driven by the turbine of the engine core. In the case of U.S. Pat. No. 6,792,745 said mechanical arrangement is a gearbox drive system operably coupled between the turbine-driven shaft and the shafts of the fans.

The mechanical arrangements described in the above-mentioned prior art raise a number of problems, particularly related to their capability to transmit power between fans through a mechanical gear-box of acceptable size and weight, so that new approaches to multi-fan engines are highly sought after by the aeronautical industry.

SUMMARY OF THE INVENTION

In one embodiment, the invention may comprise a multi-fan engine including a gas turbine engine having a turbine driving a shaft, and a plurality of fans wherein one of the fans is connected to the shaft driven directly by the turbine and all the fans are encased by geared rings configured to transmit torque from each fan to every adjacent fan to which they are geared so that the mechanical power is transmitted from the fan directly driven by the turbine to all the fans. The power generated by the turbine is transmitted through a shaft to one of the fans which distributes the power to its adjacent fans through a geared connection between them.

In another embodiment, the multi-fan engine may further comprise intermediate gears between the fans encased by geared rings to transmit the torque between adjacent fans. The intermediate gears may be connected to linear actuators for disengaging the mechanical connection between adjacent fans due to a mechanical failure or for other reasons.

In another embodiment, the multi-fan engine may be mounted to an aircraft and provide thrust to fly the aircraft. The multi-fan engines may be mounted below the wings of the aircraft or to the fuselage. Fuselage-mounted, multi-fan engines may have the fans and the nacelle housing the fans arranged to conform to the external skin of the fuselage of the aircraft so that a significant portion of the boundary layer airflow over the skin in the area of the fans is captured by the fans.

BRIEF DESCRIPTION OF THE DRAWINGS

Other characteristics and advantages of the present invention will be clear from the following detailed description of embodiments illustrative of its object in relation to the figures, which are.

DETAILED DESCRIPTION OF THE INVENTION

Figure 1:
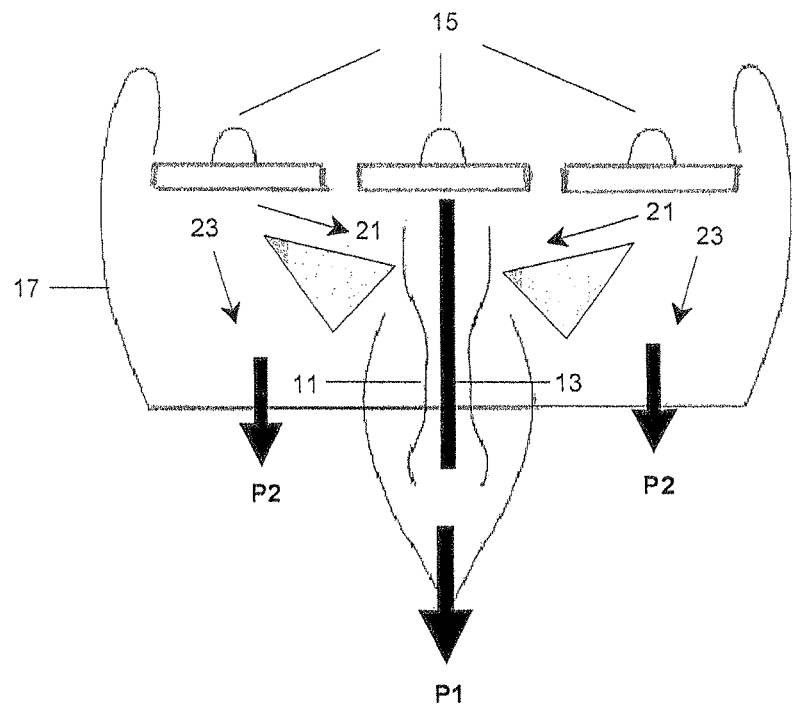
FIG. 1 is a schematic plan view of a multi-fan engine.

As shown in FIG. 1, the main components of a multi-fan engine are a casing, e.g., nacelle, 17, a gas turbine engine 11 within the casing. The gas turbine engine includes a turbine driving, e.g., rotating, a main shaft 13 and a plurality of fans 15. Each fan may be an annular row(s) of blades extending radially from a center hub. As the blades rotate, the blades impart energy to the air moving through the fan and thrust is generated as the high energy air flows downstream of the fan. A portion of the air from the fan may ducted to by-pass the gas turbine engine and discharged (see jet P2) from the casing 17. Another portion (see jet P1) of the air from the fan may be ducted into the compressor of the gas turbine engine 11.

As well known in the art, the multi-fan engine comprises primary flow-paths 21 for conducting part of the air accelerated by the fans 15 to the gas turbine engine 11 for generating the propulsive jet P1 and secondary flow-paths 23 for conducting the rest of the air accelerated by the fans 15 by-passing the gas turbine engine 11 to produce the propulsive jets P2.

Figure 2:
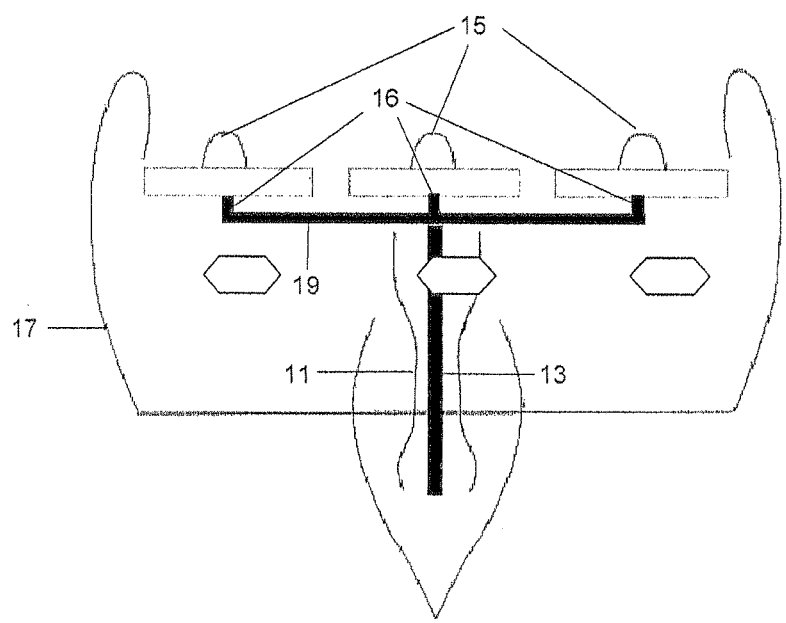
FIG. 2 is a schematic plan view of a multi-fan engine having a power transmission mechanism known in the art.

The mechanical arrangement of the prior art mentioned in the Background is illustrated in FIG. 2. Each fan 15 is driven by a shaft 16 connected to the main shaft 13 by a power transmission mechanism 19.

Figure 3:
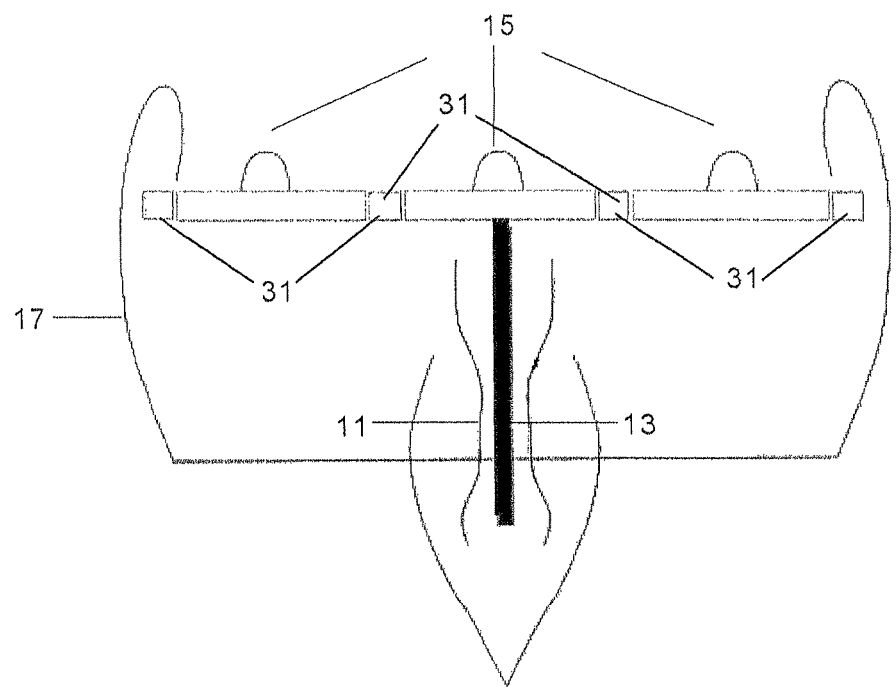
FIG. 3 is a schematic plan view plan of a multi-fan engine provided with a power transmission mechanism.

As shown in the embodiment of the invention illustrated in FIG. 3, a multi-fan engine 11 has one fan 15 directly mechanically driven by the engine shaft 13. This one fan is axially aligned with the shaft, turbine and compressor of the gas turbine engine. The other fans 15 are offset in a direction perpendicular to the axis of the gas turbine. All of the fans may rotate in a common plane that is perpendicular to the axis of the gas turbine. The fans are each encased by a respective geared ring 31, wherein the casing including the geared ring is an annular casing having an inner surface, which may be circular in cross-section, adjacent the periphery of the fan. The tips of the blades of the fan may be fastened to the inner surface of the geared ring such that the geared ring structurally supports the blades. The geared rings having an outer annular periphery with gear teeth, which may be symmetrically arranged around the periphery of the geared ring.

The gear teeth of the geared rings 31 of adjacent fans 15 intermesh so that the rotation of the fan 15 driven by the shaft 13 mechanically turns the other fans. Torque is applied by the geared ring 13 encasing the fan driven and connected to the shaft 13 to rotate the other fans. Because a single powered shaft 13 may be used to drive all of the fans, additional drive shafts are not needed for the other fans.

Figure 4:
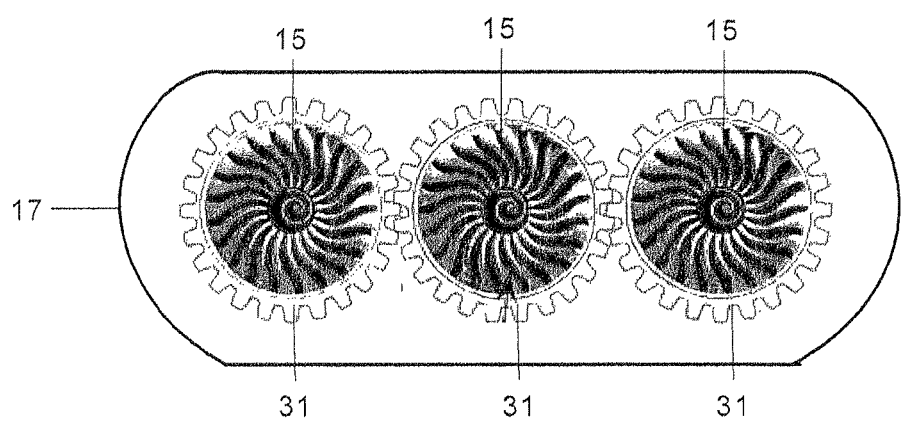
FIG. 4 is a schematic front view illustrating an embodiment of a multi-fan engine with a central fan and two lateral fans.
Figure 5:
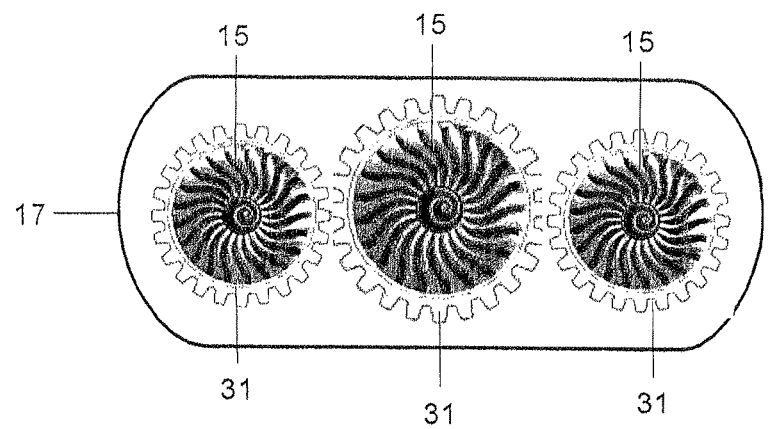
FIG. 5 is a schematic front view illustrating an embodiment of a multi-fan engine with lateral fans of lesser size than the central fan.
Figure 6:
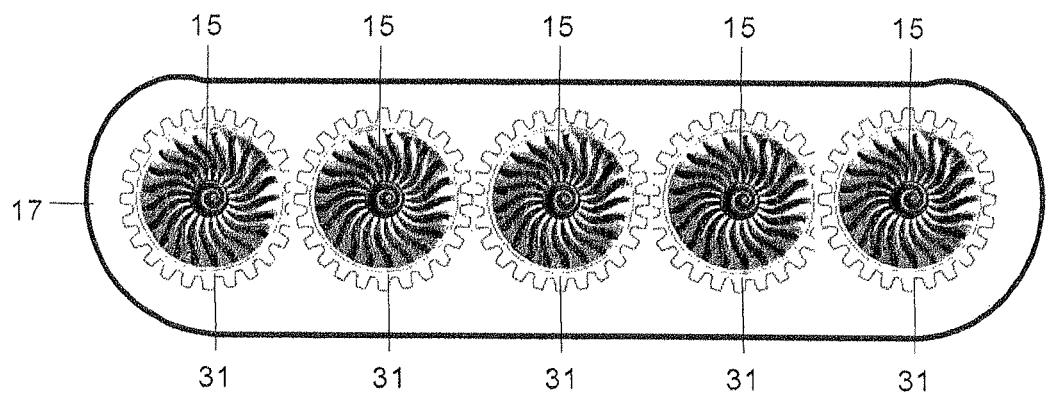
FIG. 6 is a schematic front view illustrating an embodiment of a multi-fan engine with five fans of the same dimension.

The multi-fan engine of the invention can be configured with fans 15 of the same size as illustrated in FIGS. 4 and 6 or with fans 15 of different sizes as illustrated in FIG. 5 for meeting particular needs and the arrangement can be such that the axes of rotation of the fans do not need to be aligned. A proper combination of number and dimension of fans 15 may provide a multi-fan engine of a high by-pass ratio of a suitable dimension for commercial aircraft.

Figure 7:
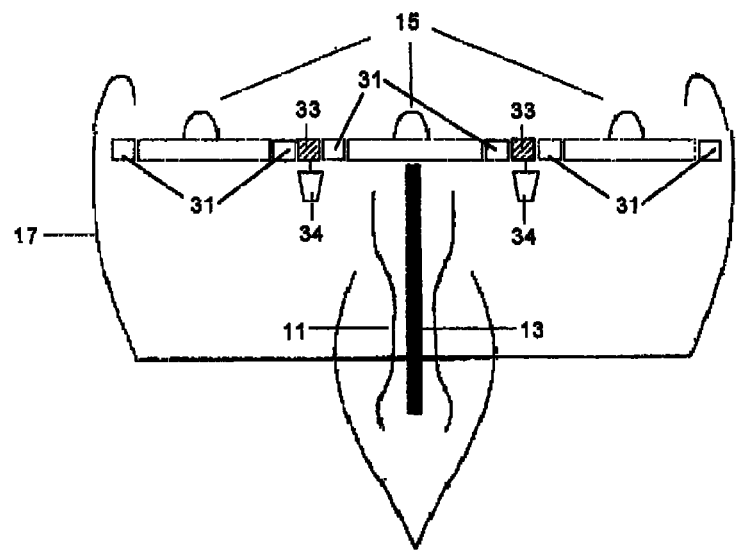
FIG. 7 is a schematic plan view illustrating an embodiment of a multi-fan engine with intermediate gears between the fans.

FIG. 7 shows an alternative embodiment of the invention that incorporates intermediate gears 33 which engage and intermesh with the geared rings 31 of adjacent fans 15. The intermediate gears 33 may be retractable to engage and disengage the geared rings 31. For each of the intermediate gears, a linear actuator 34 provides a control to move axially the corresponding intermediate gear between and into engagement with adjacent ones of the geared rings 31 and out of engagement. The linear actuators 34 may be controlled by a pilot in a cockpit or by an automatic control system to engage and disengage the intermediate gears. The linear actuators provide control to engage and disengage the fans 15 adjacent the fan driven by the turbine shaft. The fans may be disengaged in cases, for example, of fan blade rupture, mechanical failure or for any other reason.

Among others, the novel multi-fan engine disclosed herein has the following advantages with respect to the above described prior art (embodiments of the invention may include fewer than all of the advantages):

(i) Lighter overall arrangement. Heavy gearboxes and shafts coupling adjacent fans in the prior art are avoided.

(ii) Easier mounting and increased reliability due the smaller number of components, which is also attributable to the avoidance of gearboxes, shafts and other related power transmission devices.

(iii) Reduced space needed for the additional fans because space need not be allocated for power transmission shafts and gear boxes.

(iv) Intermediate gears, which are optional, and geared rings are more easily accessible than the shafts and gear boxes of conventional power transmission devices between fans. Easy accessibility facilitates inspection and servicing of the fans.

(v) Overall propulsive efficiency of a multi-fan engine with counter-rotating fans may be higher than multi-fan engines with co-rotating fans due to the recovery of rotational energy from the counter-rotating wakes.

(vi) The torque applied by each fan is reduced with counter-rotating fans because the torque of one fan is opposite to and offsets the torque from an adjacent fan. In contrast, torque from co-rotating fans applies a significant torque to the pylon, wing and fuselage.

(vii) The annular casing for the geared rings provide an annular support for the tips of each fan blade. This annular support enhances the strength and stiffness of the blades and thus allows additional design freedom to shape the fan blades to the local airflow of the blades. For example, the fan blades may have longer chords than would be practical if the fan blades were not supported by the casing of the geared rings.

The novel multi-fan engines disclosed herein may be mounted to or in the wings or other lifting or aerodynamic control surface, such as a rudder or the stabilizers. The multi-fan engine may also be mounted directly to the fuselage, such as to a side of the fuselage behind the wing an in front of or integral with the stabilizers or tail.

Figure 8:
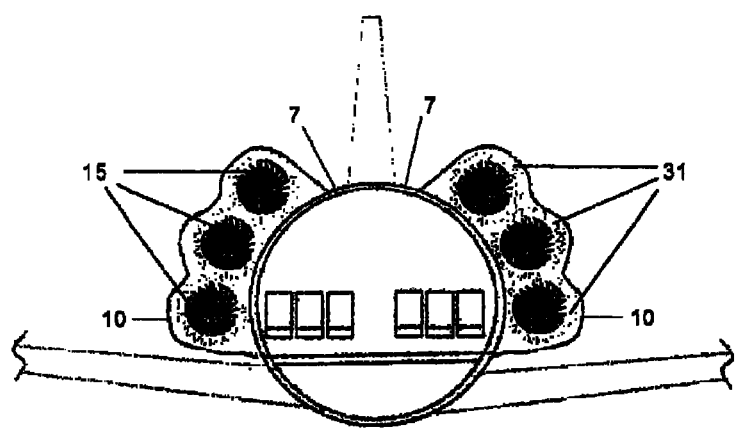
FIG. 8 is a schematic front view of an aircraft provided with two fuselage-mounted multi-fan engines according to the invention.

FIG. 8 shows an aircraft provided with two fuselage-mounted multi-fan engines 10 with three fans 15 encased by geared rings 31 arranged at a suitable distance of the external surface 7 of the fuselage so as to capture a significant portion of the airstream boundary layer flowing over the fuselage increase propulsive efficiency. The adaptability of the multi-fan engine to the external surface 7 of the aircraft fuselage is therefore a significant advantage of the invention. Each fan may be arranged in the casing such that the fan is adjacent the skin of the fuselage.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise.

The invention claimed is:

1. A multi-fan engine and aircraft assembly comprising:
    a gas turbine engine including a turbine driving a shaft;
    a first fan connected to and rotated by the shaft about an axis of the gas turbine engine;
    a second fan;
    for each of the first fan and the second fan, a geared ring encircles the fan and rotates with the fan, wherein an outer periphery of the geared ring for the first fan engages an outer periphery of the geared ring for the second fan such that torque applied by the first fan to the second fan rotates the second fan, wherein the gas turbine engine and the first and second fan are mounted to a fuselage of an aircraft, and the gas turbine engine and the first and second fans are outward of and proximate to a skin surface of the fuselage.

2. The multi-fan engine and aircraft assembly according to claim 1, wherein the second fan includes a plurality of second fans, the second fans are arranged in a plane perpendicular to the axis of the gas turbine and on opposite sides of the first fan.

3. The multi-fan engine and aircraft assembly according to claim 2, wherein each of the first fan and the second fans have the same outer diameter.

4. The multi-fan engine and aircraft assembly according to claim 2, wherein the second fans each have an outer diameter smaller than an outer diameter of the first fan.

5. The multi-fan engine and aircraft assembly according to claim 2, wherein the second fans each have an outer diameter greater than an outer diameter of the first fan.

6. The multi-fan engine and aircraft assembly according to claim 1, further comprising an intermediate gear between and intermeshing with the geared rings.

7. The multi-fan engine and aircraft assembly according to claim 1 further comprising a linear actuator attached to the intermediate gear and configured to move the intermediate gear into and out of the intermeshed engagement between the geared rings.

8. The multi-fan engine and aircraft assembly according to claim 1, further comprising:
a lifting surface extending outward of the fuselage, wherein the gas turbine engine and the first and second fans are not directly attached to the lifting surface.

9. The multi-fan engine and aircraft assembly according to claim 1 wherein for each of the first and second fans, the fan includes a row of fan blades arranged in an annular array, and a radially inward ends of the fan blades are fastened to a hub and radially outward end of the fan blades are fasten to the geared ring for the fan.

10. An aircraft comprising:
a fuselage including an outer skin surface;
a multi-fan engine mounted to the fuselage and proximate to the outer skin surface, wherein the multi-fan engine includes:
a gas turbine engine including a turbine driving a shaft;
a first fan connected to and rotated by the shaft about an axis of the gas turbine engine;
a second fan, and
for each of the first fan and the second fan, a geared ring encircles the fan and rotates with the fan, wherein an outer periphery of the geared ring for the first fan engages an outer periphery of the geared ring for the second fan such that torque applied by the first fan to the second fan rotates the second fan,
wherein a portion of the outer periphery of the geared ring for each of the first and second fan is proximate the outer skin surface of the fuselage.

11. The aircraft of claim 10 wherein the first fan and second fan are arranged proximate to the outer skin surface such that the first fan and second fan each capture a portion air flowing in a boundary layer over the outer skin surface during a flight of the aircraft.

12. The multi-fan engine according to claim 10, wherein each of the first fan and the second fan have the same outer diameter.

13. The multi-fan engine according to claim 10, wherein the second fan includes a plurality of second fans, the second fans are arranged in a plane perpendicular to the axis of the gas turbine and on opposite sides of the first fan.

14. The multi-fan engine according to claim 13, wherein the second fans each have an outer diameter smaller than an outer diameter of the first fan.

15. The multi-fan engine according to claim 13, wherein the second fans each have an outer diameter greater than an outer diameter of the first fan.

16. The multi-fan engine according to claim 10, further comprising an intermediate gear between and intermeshing with the geared rings.

17. The multi-fan engine according to claim 10 further comprising a linear actuator attached to the intermediate gear and configured to move the intermediate gear into and out of the intermeshed engagement between the geared rings.

* * * * *